W. C. QUIGLEY.
Lawn-Rake.
No. 226,419.                    Patented April 13, 1880.
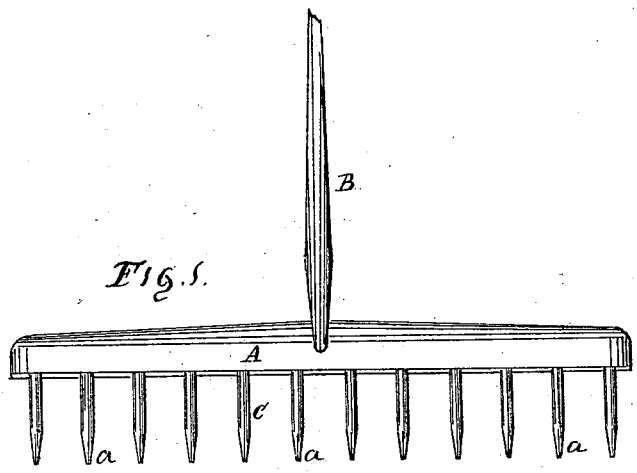
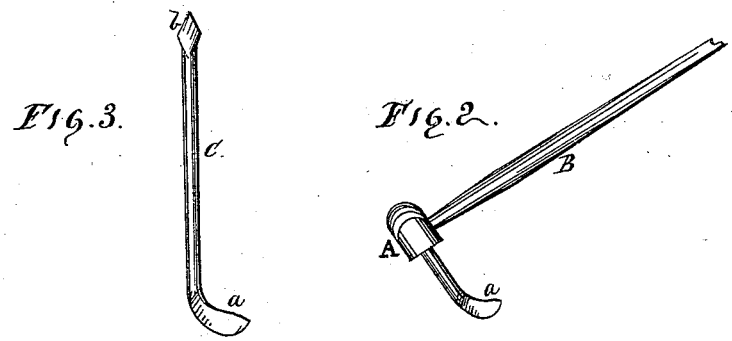

UNITED STATES PATENT OFFICE.

WILLIAM C. QUIGLEY, OF GALION, OHIO.

LAWN-RAKE.

SPECIFICATION forming part of Letters Patent No. 226,419, dated April 13, 1880.

Application filed February 20, 1880.

*To all whom it may concern:*

Be it known that I, WILLIAM C. QUIGLEY, of Galion, in the county of Crawford and State of Ohio, have invented a certain new and Improved Lawn-Rake; and I do hereby declare that the following is a full, clear, and complete description thereof.

The nature of this invention relates to certain improvements in rakes for raking up the short grass from lawns cut by a lawn-mower, or in any other manner.

The improvement above alluded to consists in giving to the ground end of the teeth of the rake a curve in direction of the handle, so that on drawing the rake along the ground the teeth will not catch in and tear the roots of the grass, but on the contrary will slide upon the ground on the curve of the teeth, the extreme ends of which are sufficiently near to the ground to run under the mown grass for raking it up. The shank of the teeth is straight, or nearly so, from the curve to the head of the rake.

To enable the teeth to run easily between the growing grass of the mown lawn and without bending and crushing it down, the sides of the curved ends of the teeth are flattened, making a thin edge or front to the teeth. The upper ends of the teeth are also flattened for the purpose of securing them firmly in the rake-head.

A more full description of the invention is as follows, reference being had to the accompanying drawings, making a part of this specification, in which—

Figure 1 represents a front view of the rake. Fig. 2 is an end view. Fig. 3 is a detached view of a tooth enlarged.

Like letters of reference refer to like parts in the several views.

The above-said rake consists of a head, A, which may be wood, of the shape and length of an ordinary hand hay-rake, of which B is the handle. C are the teeth. Said teeth may be made of wire and somewhat longer than the metal teeth of an ordinary hand-rake.

It will be observed that the extreme ends of the teeth are bent forward in direction of the handle, forming a curved projecting end, as seen at $a$. The degree of curvature given to the end of the teeth is such that while the rake is being used the curve will rest upon the ground and the point slightly above it, so that on drawing the rake along the point of the teeth will not catch in the ground among the roots of the grass, but will slide over it and pass under the loose cut grass. Hence in using the rake there is no scratching or tearing up of the ground and breaking the roots of the grass.

It will be seen in Fig. 1 that the extreme ends of the teeth are flattened sidewise and tapering to the point of a wedge-shaped form, thereby giving to them a thin front edge, so that they may draw through the grass easily without bruising and crowding it down, as a thick blunt-toothed rake must do.

The teeth of the rake by being bent will hold the grass more securely on lifting the rake for taking it up than will a straight-toothed rake, and the teeth being longer the rake will have a larger holding capacity.

That the teeth may have a firm hold in the head of the rake the upper ends, $b$, thereof are flattened or expanded, which not only prevents them from turning in the head and splitting the wood when driven therein, but also prevents them from pulling out.

By giving the ground end of the teeth curved and flattened sides in line with the curve allows the thin point of the tooth or teeth to be in the direction of the surface of the uncut grass, while the curve of the tooth rests upon the ground and slides thereon between the grass in the act of raking.

What I claim as my invention, and desire to secure by Letters Patent, is—

In hand-rakes for lawns, the teeth made of wire or rods with their ground ends curved, flattened, and tapered, as shown, a straight shank extending from said curve, and the upper ends expanded, in combination with the head and handle, substantially as and for the purpose set forth.

WILLIAM C. QUIGLEY.

Witnesses:
JACOB McGLENEN,
J. PETRI.